Jan. 31, 1956

C. W. WARREN 2,733,357

CURRENT LIMITING POWER SUPPLY FOR PHOTOMULTIPLIER

Filed Oct. 5, 1951

INVENTOR
CHARLES W. WARREN,

BY

ATTORNEY

INVENTOR
CHARLES W. WARREN,
BY
ATTORNEY

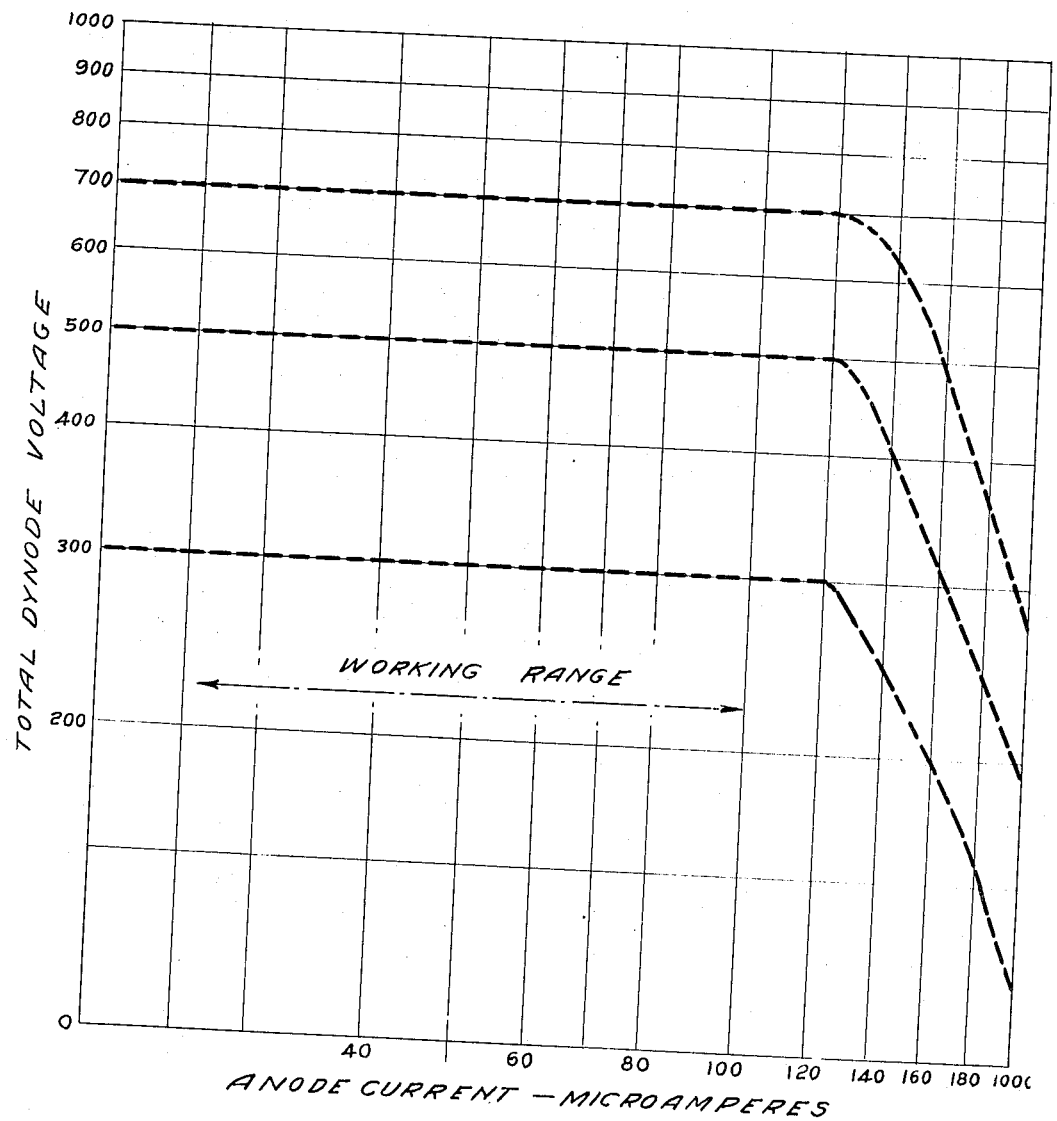

United States Patent Office 2,733,357
Patented Jan. 31, 1956

2,733,357

CURRENT LIMITING POWER SUPPLY FOR PHOTOMULTIPLIER

Charles W. Warren, North Plainfield, N. J., assignor to American Cyanamid Company, New York, N. Y., a corporation of Maine Application October 5, 1951, Serial No. 249,863

3 Claims. (Cl. 250—207)

This invention relates to a current limiting circuit for photomultiplier tubes.

Multiple anode photomultiplier tubes frequently referred to as "dynodes" are used very extensively in devices where the detection and/or measurement of very small amounts of light is necessary. The enormous multiplication made possible by the dynodes, however, imposes a serious problem. Frequently, an instrument using a photomultiplier tube with high sensitivity of extremely low light levels may accidentally be exposed to much higher light levels, for example, when the machine is opened to change samples or other elements the light emission or reflectance of which is to be measured. It is of course possible to guard against such occurrences by a complicated machine involving light locks but usually the operator is relied upon to cut off the voltage on the photomultiplier anodes when the top is to be subjected to a more intense light. This, however, puts the protection of the photomultiplier tube entirely in human and, therefore, fallible hands. Excessive light on the photomultiplier tube can soon damage the tube, for example, by reducing the emission efficiency of the cathode. Not only is the sensitivity of the photomultiplier tube damaged by excessive light and a considerable loss but when a photomultiplier tube is replaced, it is necessary in most circuits to recalibrate the whole machine for it is impossible with enormous multiplication of the multi-stage multiplier to make two tubes that are exactly alike. The loss in time and maintenance labor involved in recalibration is often an even more serious loss than the cost of the damaged photomultiplier tubes, for often a machine costing many thousands of dollars is kept out of use. Also in some instances where specially calibrated scales are used for direct reading purposes, it may be necessary to prepare a new scale when tubes are changed.

The present invention depends on an automatic control of the dynode voltages of the photomultiplier tube when the anode current exceeds a certain predetermined figure well within the safe current carrying capacity of the tube. Sharp lowering of the voltage applied to the dynodes of the photomultiplier enormously decreases its sensitivity and thus maintains a maximum current well within the safe limits of the tube's current carrying characteristics even though the photomultiplier cathode may be subjected to relatively strong illumination, many orders of magnitude greater than the low level illumination at which the tube normally operates at full sensitivity.

In the circuit of the present invention, the high voltage, of the order of a thousand volts, required by the photomultiplier tube anodes is obtained by a radio frequency oscillator and high voltage rectifier. This system, which is not the conventional one, permits very complete filtering using cheap and simple components such as resistors and condensers. The power output of the radio frequency oscillator is easily controlled by applying a controlled voltage to the oscillator tube. In the case of triode oscillator tubes, the controlled voltage is preferably the plate voltage whereas in pentode oscillator tubes, a more sensitive control is effected by controlling the voltage on the screen grid.

The control voltage is obtained very simply from the voltage drop in a resistance in the supply circuit of the photomultiplier tube. This voltage drop is then used as a signal to control a tube connected as a variable resistor. The tube in turn controls the voltage on one of the elements of the oscillator, the plate in the triode version and screen of the pentode.

The control tube may be used without other elements and this will result in a satisfactory protection of photomultiplier tubes. However, within the working range of the plate currents in the photomultiplier tube there will be some changes in the voltages on the dynode. While these changes are small compared to the great change resulting when excessive illumination strikes the photomultiplier tube, it still introduces a factor which causes the response of the photomultiplier tube to contain not only the signal but also the characteristics of the control tube. For some purposes the error introduced by changing voltages is either of no importance or can be taken account of in the calibration of the instrument. An even more perfect result is, however, possibly by introducing a suitable voltage regulator tube into the control tube circuit, either in the cathode or anode circuit, depending on whether voltage from photomultiplier anode load resistor is positive or negative with increased current. The voltage regulator tube maintains a constant voltage on the oscillator control element as long as the tube is ignited. When the amount of current drawn by the control tube drops the voltage to the point where the voltage regulator tube is extinguished, control of the oscillator output begins. If the voltage regulator tube and accompanying circuits are so arranged that the tube will remain ignited throughout the desired working range of the photomultiplier tube, the signal from the latter will be free from the regulating characteristic of the control tube, but when illumination becomes excessive the regulator tube will be extinguished and control will begin to sharply reduce oscillator output in order to protect the photomultiplier output.

The invention will be illustrated in greater detail in connection with two typical control circuits which are shown in the drawings in which:

Fig. 4 is a graph of regulation in a typical circuit with various dynode voltages.

Figure 1:
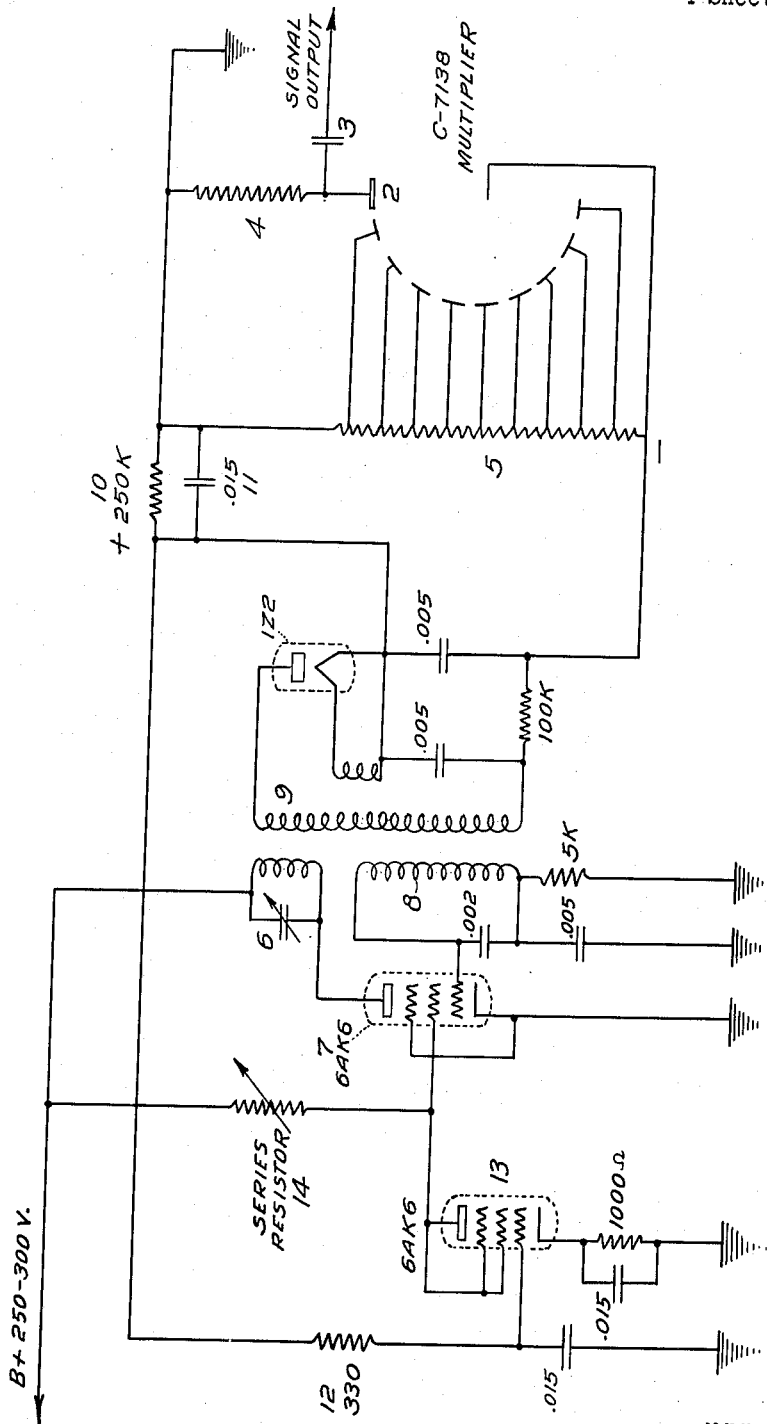
Fig. 1 is a schematic diagram of a control circuit using a pentode oscillator with screen grid voltage control.

In Fig. 1, the photomultiplier tube is shown at 1. Only the circuits of the photomultiplier tube are shown as the nature of the instrument receiving the signal from the photomultiplier tube is not concerned in the regulatory circuits of the present invention. Therefore, the signal from the final anode 2 is simply shown as passing through a direct current stopping capacitor 3 to whatever device is controlled or actuated by the photomultiplier signal. The design of the working connections of the photomultiplier does not require any change for an additional anode load resistor. The voltage dividing network 5 connecting to the intermediate anodes of the photomultiplier is not changed. The latter is the conventional dividing circuit and the resistances need not be specified. Where resistance values have significance, they are expressed in the conventional manner using "K" for kilohms.

Voltage for the photomultiplier tube is obtained from 6AK6 pentode 7, operating as a radio frequency oscillator using the tunable tank circuit 6 in its plate supply. The grid circuit including the coil 8 is of conventional design. All capacities are expressed in microfarads ($\mu f.$). The plate circuit 6 forms the primary of a transformer, the secondary of which 9 feeds a 1Z2 high voltage rectifier. The high voltage after suitable filtering is applied to the multiplier tube, the anode being near ground potential with the cathode at high negative potential.

The control circuit of the present invention includes a 250 K resistor 10 to ground with a by-pass condenser 11 which short circuits the control resistor at signal frequencies. The high potential end of the resistor 10 connects through a suitable filter resistor 12 to the grid of the control tube 13, which is shown with the 6AK6 connected as a self-biased triode. A. C. components are by-passed to ground by the conventional condenser. The anode of tube and the resistor 14 may be considered as constituting a voltage divider in which the tube operates as a variable resistor depending on the voltage applied to its control grid. Since the screen grid of the oscillator tube is connected at a point where the tube joins the resistor its voltage will vary as the tube resistance changes. For smooth control it is often desirable to vary the voltage on the screen grid nonlinearly with voltage on the grid of the tube 13. This is easily effected by a suitable biasing resistor in the cathode circuit.

In operation, the resistor 14 is adjusted under conditions of no illumination of the photomultiplier tube until the voltage on the screen of the oscillator 7 has a suitable value to provide the desired high voltage on the anode 2 of the photomultiplier tube. Under low illumination, the voltage drop through the load resistor 4 and control resistor 10 is comparatively small. When, however, excessive illumination of the photomultiplier tube cathode takes place, the voltage on the control grid of the control tube 13 increases, this tube begins to draw a large amount of current. The resulting voltage drop through the resistor 14 lowers the screen voltage of the oscillator tube 7 and hence decreases oscillator output and therefore anode voltage on the photomultiplier tube 1 until the current decreases to a safe value. The control operates with a small time delay which, however, is large compared to signal frequency, so that the photomultiplier tube 1 cannot operate at excessive current level for sufficient time to damage it.

Figure 2:
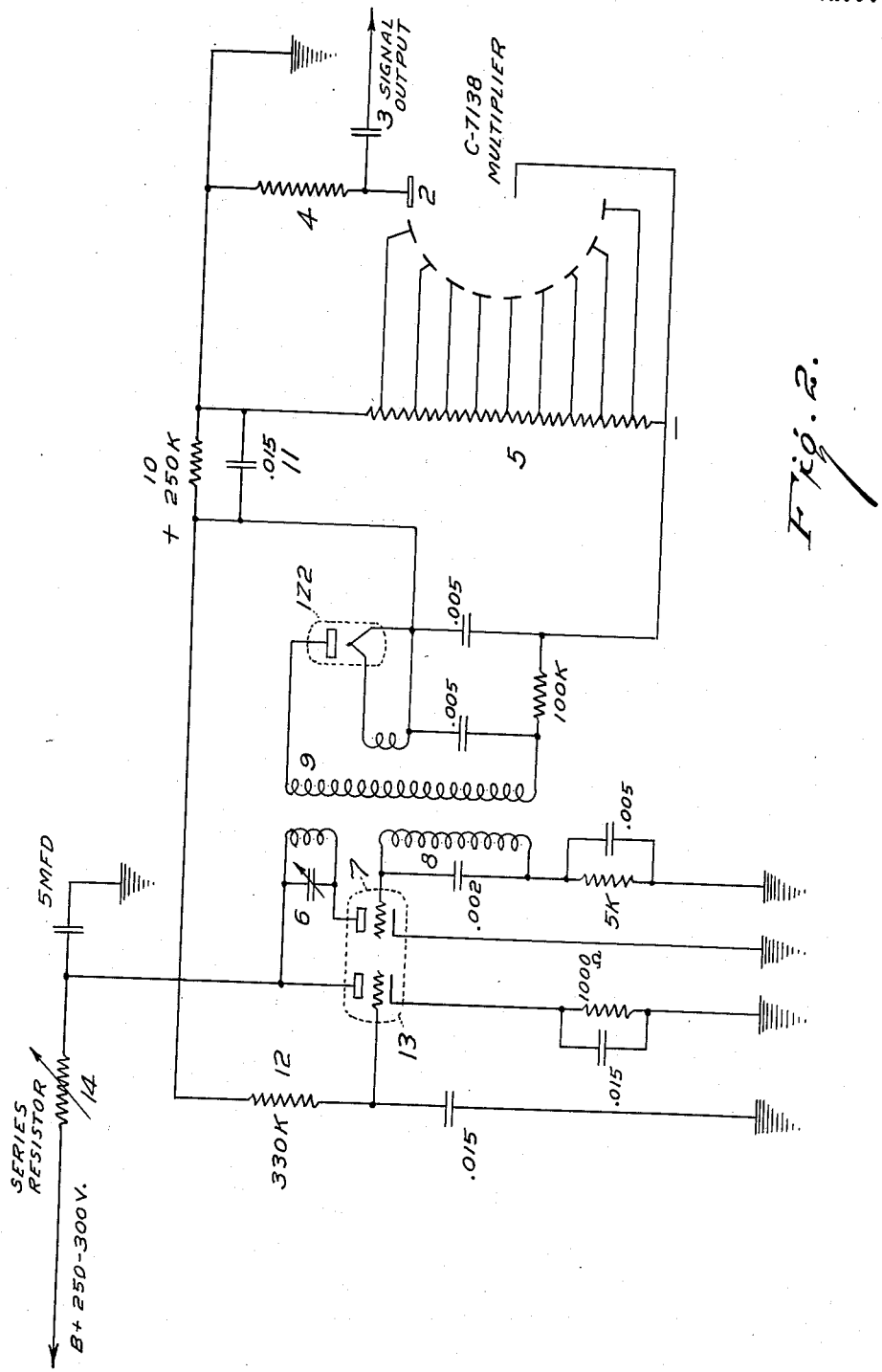
Fig. 2 is a schematic diagram showing a control circuit using a triode oscillator in which control is effected by varying plate voltages.

Fig. 2, in which the same elements bear the same reference numerals, shows a slightly different design of oscillator. In this case, control tube and oscillator are two sections of a 12AU7. The operation, however, is the same. The control voltage is developed across the resistor 10. The operation as in the case of the circuit of Fig. 1 results in a varying current through the control tube section 13 of the 12AU7 which varies the voltage drop through the resistor 14 and therefore the plate voltage on the oscillator section 7. The circuit of Fig. 2 is simple, requiring only a single dual purpose tube but the regulation is not quite so sharp as in the case of the pentode oscillator in the Fig. 1 which is more sensitive to changes in control voltage.

Figure 3:
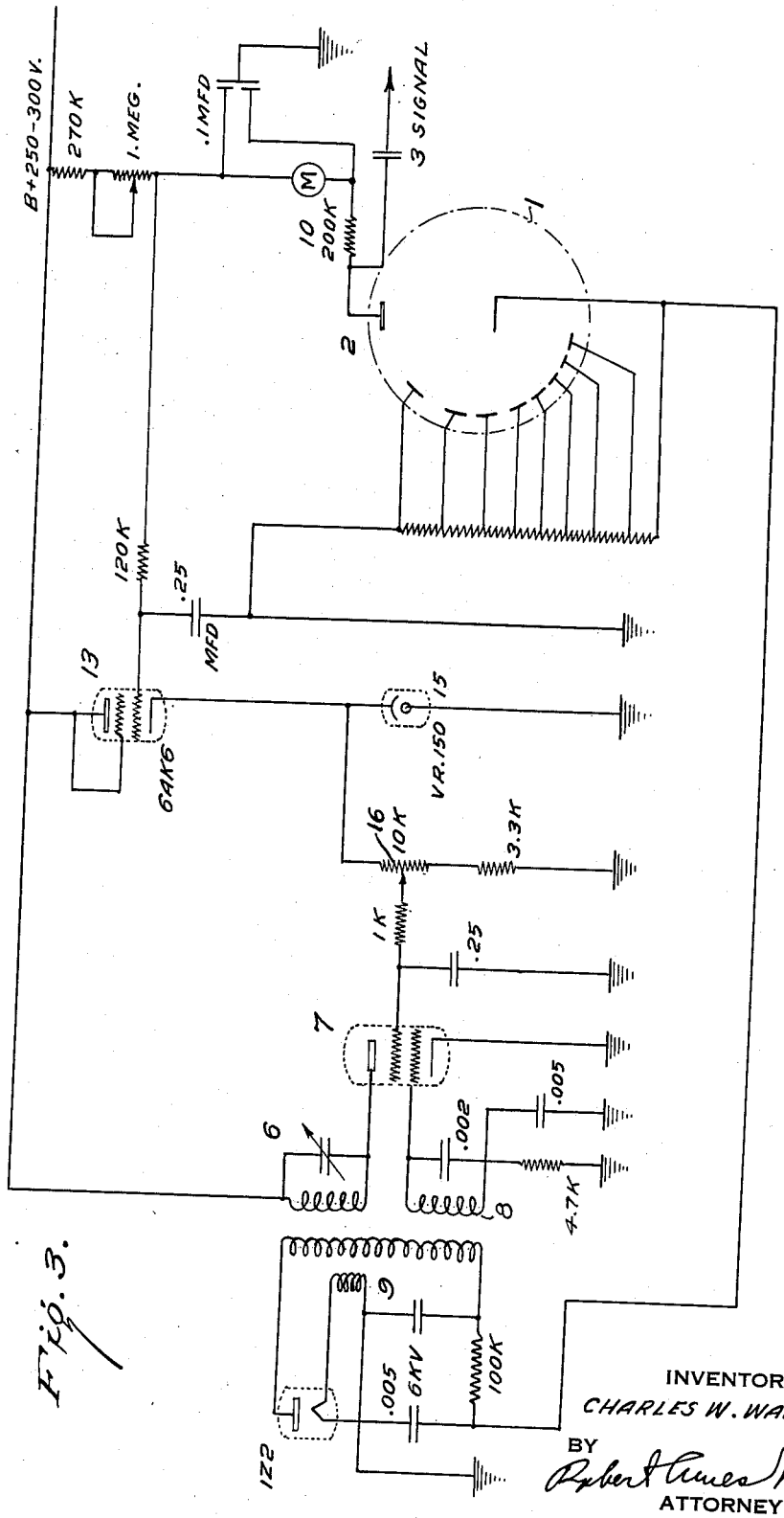
Fig. 3 is a schematic diagram using a control tube associated with a voltage regulator.

In Fig. 3 the circuit is similar to Fig. 1 except that the photomultiplier anode 2 receives B+ voltage from the ordinary power supply and a voltage regulator tube 15, type VR150, is connected between the cathode and ground of the control tube. Instead of connecting the control grid of the oscillator tube 7 to the junction of a variable resistor and the anode of the control group including the regulator tube 15 the connection is to the potentiometer 16 in the cathode circuit of the control tube 13 which potentiometer with an additional resistor is in parallel with the voltage regulator tube 15. The rest of the oscillator circuit and high voltage rectifier is the same as in the preceding figures except that the voltage required is not as high since the anode 2 of the photomultiplier tube, instead of being connected to ground potential, has applied to it the positive voltage of the power supply. Accordingly, the oscillator is required to supply only from about 300–700 volts between ground and cathode of the photomultiplier tube. The circuits are adjusted principally by the setting of the potentiometer 16 so that in the working range of the photomultiplier tube the voltage regulator tube 15 remains ignited. Accordingly, throughout the working range of the photomultiplier voltages on the dynodes of the photomultiplier tube remain constant. However, as soon as the illumination on the photomultiplier tube exceeds a certain predetermined limit, the current drawn by the control tube 13 drops the cathode voltage to the point where the regulator tube is extinguished. The current of the control tube then flows through the potentiometer 16 and any further increase in current results in a very rapid drop in voltage on the screen grid of the oscillator 7 which reduces the voltage applied to the photomultiplier dynodes.

Fig. 4 is a graph of a typical operation of the circuit of Fig. 3 for different voltages on the dynodes. In each case the circuit elements have been adjusted so that the voltage regulator tube 15 is extinguished when the current flowing to the anode 2 reaches 120 microamperes. It will be noted that the voltages stay absolutely constant throughout the whole of the working range of the photomultiplier tube which renders this modification of this invention the preferred one where maximum accuracy is required.

Fig. 3 shows the application of a voltage regulator tube to a circuit in which the oscillator tube is controlled by varying the voltage on a screen grid of a tetrode. In exactly the same manner, the triode circuit of Fig. 2 may be provided with the advantages of the modification using a voltage regulator tube.

The advantages of using the power supply voltage as part of the total voltage on the anode of the photomultiplier tube can also be enjoyed with the modifications shown in Figs. 1 and 2 even though no voltage regulator tube is used.

In the drawings, there have been shown typical circuits using well-known receiver type tubes. The values of resistances and capacitors give satisfactory regulation in the circuit shown. It is an advantage of the present invention, however, that these values are not critical and ordinary elements may be used, for example, resistors in commercially readily available tolerances. Other tubes may, of course, be used with suitable adjustment of the values of the circuit components to correspond to the tube characteristics.

In Figs. 1 and 2 the control elements of the oscillator tube, plate in the case of triode and screen grid in the case of pentode, are shown as connected to the point where the control tube joins the resistor to form a voltage divider. This gives the most sensitive control and is preferred. It is obvious, however, that it is not necessary that the voltage be taken off exactly at the point on the voltage divider where the resistor connects to the control tube. The connection may be at other points but in order to obtain adequately sensitive control, such points must be at a potential near that of the junction of the tube and resistor. This condition is illustrated in the modification shown in Fig. 3 where the screen grid of the oscillator tube is connected to a point near, but not exactly at, the junction of the control tube and resistor.

The control circuit applies a positive control voltage when the current of the photomultiplier tube increases beyond a predetermined point. This is by far the most satisfactory arrangement and is preferred. It is obvious, of course, that the controlled element of the control tube, in which case the control voltage, must become more negative with excessive currents.

It will be noted that the control tube and its resistance in each of the modifications shown vary the D. C. power input of the R. F. oscillator. In some cases a variation of the D. C. anode voltage is effected, in others a variation of the screen voltage. Both of these types of voltage are parts of the total D. C. power input.

This application is in part a continuation of my prior application Serial No. 208,510, filed January 30, 1951, now abandoned.

I claim:

1. A current control circuit for photomultiplier tubes comprising a power supply for the photomultiplier tube at least a portion of which includes a radio frequency electron tube oscillator, at least one D. C. power input to said oscillator, a resistance element in the circuit connecting the power supply to the anode of the photomultiplier tube, filtering means between the anode and the resistance element having a sufficient time constant to eliminate alternating current fluctuations in the resistance element, whereby fluctuations in the average photomultiplier anode current result in variations in potential drop across the resistance element constituting a varying control voltage, a voltage divider in at least one D. C. power supply input to the oscillator, said divider comprising an electronic tube having a control grid and at least one resistance in series therewith, a gas voltage regulator tube having a firing voltage not less than that of the D. C. power input to the oscillator for maximum photomultiplier tube sensitivity shunting at least a portion of the voltage divider resistance, the electronic tube in the voltage divider being capable of a tube current over a predetermined grid bias range which current multiplied by the portion of the voltage divider resistance which is shunted by the voltage regulator tube at least equal to the firing voltage of said tube, a circuit connection from the voltage divider to an electrode of the R. F. oscillator tube, said connection being from a point on the regulator tube shunted portion of the voltage divider resistance whereby D. C. power input to the oscillator flows from this point, connecting means from the control resistance in the anode circuit of the photomultiplier tube to the control grid of the electronic tube in the voltage divider, whereby current fluctuations in the resistance apply voltage to said control grid which voltage decreases with increasing anode current and hence decreases current through the voltage divider electronic tube and therefore voltage on the regulator tube, whereby as the average photomultiplier anode current increases at first no change in D. C. power input to the oscillator and hence photomultiplier power supply results so long as the regulator tube is ignited but when the current increases to a point where the regulator tube extinguishes further increase results in a decrease in D. C. current input to the oscillator and hence a decrease in the voltage applied to the photomultiplier tube anodes.

2. A circuit according to claim 1 in which the resistance shunted by the regulator tube is in the cathode circuit of the voltage divider electronic tube.

3. A circuit according to claim 2 in which a portion at least of the voltage divider resistance shunted by the regulator tube is in the form of a potentiometer the connection to the oscillator electrode being to the movable arm of said potentiometer whereby a series of photomultiplier tube sensitivities can be obtained by adjustment of the potentiometer each range being controlled by the voltage regulator tube up to the predetermined maximum photomultiplier anode current at which the regulator tube extinguishes.

References Cited in the file of this patent

UNITED STATES PATENTS

| | | |
|---|---|---|
| 2,454,169 | Haynes | Nov. 16, 1948 |
| 2,474,098 | Dimmick | June 21, 1949 |
| 2,478,163 | Sweet | Aug. 2, 1949 |
| 2,534,668 | Gunderson | Dec. 19, 1950 |
| 2,548,755 | Vossberg et al. | Apr. 10, 1951 |